United States Patent
Le Perchec

(10) Patent No.: US 8,937,277 B2
(45) Date of Patent: Jan. 20, 2015

(54) MONO- OR MULTIFREQUENCY OPTICAL FILTER, AND DETECTOR COMPRISING SUCH A FILTER

(75) Inventor: Jerome Le Perchec, Grenoble (FR)

(73) Assignee: Commissariat a l'Energie Atomique et Aux Energies Alternatives, Paris (FR)

( * ) Notice: Subject to any disclaimer, the term of this patent is extended or adjusted under 35 U.S.C. 154(b) by 260 days.

(21) Appl. No.: 13/641,029

(22) PCT Filed: Feb. 25, 2011

(86) PCT No.: PCT/FR2011/050398
§ 371 (c)(1),
(2), (4) Date: Oct. 12, 2012

(87) PCT Pub. No.: WO2011/128535
PCT Pub. Date: Oct. 20, 2011

(65) Prior Publication Data
US 2013/0032702 A1  Feb. 7, 2013

(30) Foreign Application Priority Data
Apr. 15, 2010 (FR) ..................... 10 52867

(51) Int. Cl.
*G02B 5/18* (2006.01)
*G02B 6/12* (2006.01)
*G02B 5/20* (2006.01)

(52) U.S. Cl.
CPC ............ *G02B 6/12007* (2013.01); *G02B 5/208* (2013.01); *G02B 6/12004* (2013.01); *G02B 5/1809* (2013.01); *G02B 5/204* (2013.01); *G02B 2006/12107* (2013.01)
USPC ................... 250/226; 385/37; 385/38

(58) Field of Classification Search
CPC ................. G02B 5/1809; G02B 5/204; G02B 2006/12107
USPC .............. 250/208.1, 216, 226; 385/37, 38, 12
See application file for complete search history.

(56) References Cited

U.S. PATENT DOCUMENTS 6,154,480 A    11/2000  Magnusson et al.
7,167,615 B1   1/2007   Wawro et al.
(Continued)

FOREIGN PATENT DOCUMENTS

FR    2893184 B1    12/2007
WO    WO-9642026 A1    12/1996
WO    WO-0152329 A1    7/2001

OTHER PUBLICATIONS

European Patent Office, International Search Report for PCT/FR2011/050398 dated Apr. 4, 2011, English and French languages (6 pgs).

(Continued)

*Primary Examiner* — Tony Ko
(74) *Attorney, Agent, or Firm* — Harris Beach PLLC

(57) ABSTRACT

The invention relates to a monofrequency optical filter, including reflective elements which are formed on one surface of a dielectric support layer and which define at least one periodic array of parallel grooves passing across same. The periodicity, height, and width of said periodic groove array are selected so as to form a structure, the wavelength of which can be selected from within a predetermined range of wavelengths. According to the invention, the thickness and refractive index of the support layer are selected so that said layer forms a half-wave plate for a wavelength of the predetermined wavelength range. The filter, when in contact with the surface of the support layer opposite the surface on which the groove array is formed, includes a medium, the refractive index of which is less than that of the support layer so as to obtain a guided mode that resonates in the support layer.

23 Claims, 7 Drawing Sheets

(56) References Cited

U.S. PATENT DOCUMENTS

| | | | |
|---|---|---|---|
| 7,689,086 B2* | 3/2010 | Magnusson et al. | 385/129 |
| 8,747,751 B2* | 6/2014 | Duer et al. | 422/82.11 |
| 2006/0273245 A1 | 12/2006 | Kim et al. | |
| 2008/0232411 A1* | 9/2008 | Reid et al. | 372/20 |
| 2009/0067774 A1 | 3/2009 | Magnusson | |

OTHER PUBLICATIONS

A. Barbara P. Quemerais, et al "Optical transmission through subwavelength metallic gratings", Physical Review B 66, 161403(R), 2002 (pp. 161403-1-161403-4).

Gregory Vincent, et al "Large-area dielectric and metallic freestanding gratings for midinfrared optical filtering application", J. Vac. Sci. Technol. B 26(6), Nov./Dec. 2008 (pp. 1852-1855).

J.A. Porto, et al "Transmission Resonances on Metallic Gratings with Very Narrow Slits", The American Physical Society, vol. 83 No. 14, Oct. 4, 1999 (pp. 2845-2848).

Hans Lochbihler, et al "Highly conducting wire gratings in the resonance region", Applied Optics, vol. 32, No. 19, Jul. 1, 1993 (pp. 3459-3465).

Che-Lung Hsu, et al "Flattened Broadband Notch Filters Using Guided-Mode Resonance Associated With Asymmetric Binary Gratings", IEEE Photonics Technology Letters, vol. 18, No. 24, Dec. 15, 2006 (pp. 2572-2574).

Thomas Zentgraf, et al "Ultranarrow coupling-induced transparency bands in hybrid plasmonic systems", Physical Review B 80, 195415 (2009) (pp. 195415-1-195415-6).

* cited by examiner

Lambda (nm)

MONO- OR MULTIFREQUENCY OPTICAL FILTER, AND DETECTOR COMPRISING SUCH A FILTER

CROSS-REFERENCE TO RELATED APPLICATIONS

This application is a national stage application under 35 U.S.C. §371 of PCT Application No. PCT/FR2011/050398, filed Feb. 25, 2011, which claims priority to and the benefit of French Application No. 1052867 filed on Apr. 15, 2010, which are incorporated herein by reference in its entirety.

DOMAIN OF THE INVENTION

The present disclosure relates to frequency-selective optical frequency filters and more specifically to micro- or nanostructured optical filters having a narrow transmission bandwidth and a high rejection factor outside of this band.

Such filters may especially be used in the field of photodetection in the visible and infrared ranges, and are more specifically intended for the spectral detection of gases and for visible and infrared color imaging.

BACKGROUND

Micro- or nanostructured optical frequency filters are generally preferred because of their great compactness which enables them to be integrated in photodetectors. Such filters usually comprise a support layer having a metallic grating of slits smaller than the wavelength to be filtered formed thereon. The amplitude of the transmission is determined by both the width and the thickness of the slits, the thickness being selected to be at least equal to half the considered wavelength. Such a thickness for example corresponds to several hundreds of nanometers in infrared.

Further, in this type of detector, the refractive index of the support is systematically selected to be as small as possible in order to disturb the slit grating transmission as little as possible. The search for the lowest possible refractive index has thus resulted in filters with a metallic slit grating directly suspended above air (refractive index close to 1), which is difficult to achieve technologically.

It is also remarkable that there is no further degree of liberty to adjust the shape of the transmission profile (amplitude and width of the transmission band, or transmission "peak"), the characteristics of the grating (periodicity, slit thickness and width) being essentially used to position the transmission band in the spectrum.

Thereby, the amplitude and the rejection factor of this type of filters are imposed and are typically quite unsatisfactory. In particular, the rejection factor is smaller than 90%, and in most cases smaller than 80%, outside of the bandwidth of interest.

This type of filter has for example being described by H. Lochbilher and R. Depine, "*Highly conducting wire gratings in the resonance region*", Applied Optics, 32, p. 3460, 1993, by J. A. Porto, F. J. Garcia-Vidal and J. B. Pendry, "*Transmission resonances on metallic gratings with very narrow slit*", Physical Review Letters, 83, p. 2845, 1999, by G. Vincent et al., "*Large-area dielectric and metallic freestanding gratings for midinfrared optical filtering application*", Journal of Vacuum Science Technology, B 26, p. 852, 2008, by A. Barbara et al., "*Optical transmission through subwavelength metallic gratings*", Physical Review, B 66, p. 852, 2002, or again in documents U.S. Pat. No. 7,420,156, US 2009/0073434 and WO 2007/118895.

T. Zentgraf et al.'s publication, "*Ultranarrow coupling-induced transparency bands in hybrid plasmonic systems*", Physical Review, B 80, p 195415, 2009 describes a periodic grating of thin strips, formed on a transparent substrate at the considered wavelength, and embedded in a dielectric layer forming a waveguide. The total strip surface area does not exceed 20% of the total surface area of the grating and the transmission response is set by the grating dimensions as well as by the height of the dielectric layer where the grating is embedded.

The obtained transmission peak is very thin, with a width on the order of 1% of the wavelength to which the filter is tuned at mid-height of the peak, of high amplitude, close to 90% at this wavelength, and with a rejection factor around the transmission peak close to 90%.

However, the gain in terms of liberty obtained by introducing the waveguide combined with a thin strip grating is essentially obtained for the shape of the transmission profile. Thus, the spectral range where a good rejection is provided around the transmission peak is very limited, between 845 and 855 nanometers, while many applications require a spectral rejection range having a width on the order of half a wavelength, that is, 400 nm or more in the present example. Further, the rejection factor around the peak still remains too low for certain applications.

Moreover, this filter only transmits the electromagnetic radiation component polarized parallel to the grating strips, and it is not possible to transmit the orthogonally-polarized component. It has indeed been shown that the stacking of thin orthogonal strips, respectively forming a first grating for the first polarization and a second grating for the second orthogonal polarization, is not operative. Similarly, a metallic grating formed of rectangular pads, defining two orthogonal gratings, is not operative either. The only solution to transmit two different polarizations then is to juxtapose two gratings of strips of different orientation, which adversely affects the filter compactness.

Finally, the filter is tuned according to the thickness of the dielectric layer where the grating is embedded.

The forming of a multiple-frequency filter having several transmission bandwidths thus requires forming a dielectric layer of variable thickness. Such a construction increases the number of manufacturing steps and adversely affects the subsequent integration of the filter in a circuit such as, for example, a photodetector.

SUMMARY OF THE INVENTION

The present invention aims at overcoming the disadvantages of the state of the art by providing a micro- or nanostructured single-frequency optical filter which is compact, which can be tuned in a wide range of wavelengths, spanning from 250 nanometers to some hundred micrometers, which has a selective transmission bandwidth, that is, a midheight width of the transmission peak smaller than 10% of the wavelength for which the peak is maximum, while remaining usable in practice with a good rejection on a spectral range around the transmission peak having a width at least equal to half the wavelength for which the peak is maximum, which has a rejection factor greater than 90%, which can transmit one or several polarizations according to the desired application, and which can be easily extended to a multiple-frequency use.

To achieve this, the invention aims at a single-frequency optical filter comprising elements with a negative electric permittivity, and especially reflectors, formed on a surface of a dielectric support layer and defining at least one periodic grating of parallel through slits, the periodicity, the height, and the width of the slits being selected to that said slit grating forms a wavelength-selective structure for a wavelength ranging within a predetermined wavelength range.

According to the invention:

the thickness and the refractive index of the support layer are selected so that said layer forms a halfwave plate for a wavelength from said predetermined range of wavelengths;

the filter further comprises, in contact with the surface of the support layer opposite to that having the slit grating formed thereon, a medium having a refractive index smaller than that of the support layer to obtain an electromagnetic resonance in the support layer;

the period of the or of each periodic slit grating ranges between approximately $$\frac{\lambda}{n1}$$

and approximately $$2 \times \frac{\lambda}{n1},$$

where $\lambda$ is a wavelength from the predetermined range of wavelengths and $n1$ is the refractive index of the support layer;

and the refractive indexes of the support and of the medium satisfy relation $$n1 \geq \frac{5}{3} \times n2,$$

where $n1$ is the index of the support layer, and $n2$ is the index of the medium.

In other words, the filter according to the present invention is the combination of a conventional slit grating, of a halfwave plate supporting the grating, and of a medium in contact with the halfwave plate having therewith the largest possible refractive index contrast. In practice, the highest possible index is desired for the halfwave plate.

Thereby, the halfwave plate forms a waveguide under the slit grating, this grating being further capable of exciting surface plasmon modes. The combination of the grating, of the plate, and of the strong index contrast thus provides an electromagnetic resonator efficiently trapping light in the plate before it escapes through the medium.

It should be noted that this combination according to the invention introduces a real additional degree of liberty, which enables, to a large extent, to decouple the positioning of the transmission band from the profile of this transmission. Not only does this additional degree of liberty open up opportunities unknown to the state of the art but, further, instead of complicating the filter design, the implementation of this additional degree simplifies it.

Thus, a selective transmission peak is obtained with a rejection factor greater than 90%. In practice, it is possible to set the peak so that its mid-height width is smaller than or equal to 10% of the wavelength for which this peak is maximum and so that the spectral range where a good rejection is provided is greater than or equal to range $[\lambda-\lambda/4; \lambda+\lambda/4]$, where $\lambda$ is the wavelength for which the peak is maximum. It is thus advantageously possible to obtain a selective and exploitable transmission peak.

Further, such a filter can operate in a wide range of wavelengths, spanning from 250 to some hundred micrometers, that is, from ultraviolet to the terahertz range, and can thus in particular operate in the infrared or visible range.

Moreover, the index and the thickness of the plate define a range of operating wavelengths and the periodicity and the width of the slits enable to accurately set the location of the transmission peak in the range defined by the plate.

In particular, it is thus possible to provide several juxtaposed slit gratings on the plate, dedicated to different wavelengths, while keeping an identical thickness at any point of the filter.

Further, according to the desired application, it is possible to simply provide one or several slit gratings, for example, orthogonal slit gratings to transmit perpendicularly-polarized components of the electromagnetic radiation, while ensuring a transmission greater than 50%.

Further, in the filter according to the invention, the slit grating is always mechanically supported by the support layer, so that the filter manufacturing implies no technologically complex step such as, for example, the suspension of the slit grating.

Further, the filter according to the invention may also be used in reflection mode, since it forms a selective band stop reflector having a reflection factor greater than 90% outside of the stopped band.

Further, when a filtering is desired is a given wavelength range, the thickness of the halfwave plate is not necessarily set on the middle of the range to obtain the desired effect. Preferably, the plate thickness is set to be slightly smaller than $$\frac{\lambda}{2 \times n1}.$$

The inventor has indeed noticed that there is a 15% margin around $$\frac{\lambda}{2 \times n1}$$

to size the different elements forming the filter, while guaranteeing a satisfactory operation thereof, the physical effect being robust within this range.

More specifically, the operation of the filter according to the invention is based on a coupling between the modes of the waveguide formed by the halfwave plate and the plasmon modes. The complexity of such a coupling thus explains that a slightly smaller thickness (within this 15% range) may make the spectral response better than if exact law $$\frac{\lambda}{2 \times n1}$$

of the guided mode alone is respected.

Further, the period of each slit grating is selected according to the index of the halfwave plate and enables to finely adjust the location of the transmission peak in the wavelength range defined by the halfwave plate. Thus, in particular, the larger the period of the grating, the larger the transmission peak wavelength.

While the characteristics of the halfwave plate and the periodicity of the slits enable to set to the location of the transmission peak in the spectrum, the slit width enables to adjust the maximum amplitude and the width of this peak. In particular, a small slit width results in a small width of the peak but with a low maximum peak height, and vice-versa.

For large wavelengths (terahertz, infrared), it is desirable for the slit width to be much smaller than the grating period, that is, on the order of one tenth or less of the grating period, which improves the reflectivity and the selectivity of the "mirror" formed by the metallic grating at large wavelengths. The slit width may be also be used to adjust the location of the peak.

It has finally been observed that relation $$n1 \geq \frac{5}{3} \times n2$$

between indexes is sufficient to obtain a high-quality resonance in the halfwave plate.

According to an embodiment, the elements with a negative electric permittivity are reflective, and are especially metallic.

According to an embodiment, the thickness of the support layer ranges between 0.85×λ/2×n1 and approximately 1.15×λ/2×n1. In particular, λ is selected to be equal to 4 micrometers when a filtering in the 3-5 micrometer infrared range is desired.

Advantageously, the width of the slits of the or of each periodic slit grating is smaller than one third of the grating period.

According to an embodiment of the invention, the support layer is formed of a material selected from the group comprising $Si_3N_4$, SiN, ZnS, GaP, $Al_2O_3$, $Cr_2O_3$, ZnO, SiC, $TiO_2$, $MgF_2$, $SrF_2$, LiF, NaF, and $CaF_2$, and transparent organic materials having a refractive index greater than 5/3, or of an alloy of these materials.

In other words, these materials are sufficient to obtain a significant index contrast in the visible range, that is, from 380 nm to 780 nm, when the halfwave plate is suspended above a medium having an index close to 1, such as air, or in contact with a material having a low index such as nanoporous or low-density materials, such as for example nanoporous silica or certain carbonated materials such as C60 fullerenes.

According to an embodiment, the support layer is formed of a material selected from the group comprising Si, Ge, SiGe, CdTe, ZnS, InP, InSb, AlSb, GaSb, GaAs, and HgCdTe, $ZnFe_2O_4$, birefringent materials, or an alloy of these materials. As an example of birefringent materials, one may especially mention perovskite $CaTiO_3$, HgS, hematite $Fe_2O_3$, and rutile $TiO_2$.

In other words, such materials are sufficient to obtain a significant index contrast in the infrared range, with certain dielectrics such as for example $SiO_2$ and $Si_3N_4$.

According to an embodiment of the present invention, the elements of negative electric permittivity forming said at least one slit grating are formed of a metal and have a thickness ranging between approximately 1 time and approximately 3 times the skin depth of the metal. In particular, the elements of negative electric permittivity forming the at least one slit grating are made of aluminum and have an identical thickness smaller than 50 nanometers.

In other words, conversely to the state of the art, small thicknesses are possible for the grating, and are even desired to increase the compactness of the filter.

As a variation, the elements of negative electric permittivity forming the at least one slit grating are formed of a material having a permittivity with an imaginary part selected so that said material is reflective in the wavelength range, and especially Si (in the UV range) or heavily-doped Si (in the IR range). According to another variation, the elements of negative electric permittivity forming the at least one slit grating are formed of an ion crystal having a negative permittivity in certain frequency ranges, and especially SiC in far infrared.

In other words, these materials have reflective properties similar to those of metals and can advantageously replace them. There thus is some liberty as to the selection of the materials for forming the technological stack. The designer is free to select a material for the elements of negative electric permittivity which bonds well to the layer supporting them. In the same way as for metals, the thickness of the slits formed in such materials may be small to increase the filter compactness. Advantageously, this thickness ranges between once and three times the conventional field penetration thickness.

According to a specific embodiment of the invention, the elements of negative electric permittivity are rectangular blocks defining two orthogonal periodic slit gratings. In particular, the blocks are square and define two slit gratings of same periodicity.

The filter according to the invention thus enables to transmit polarized components of the electromagnetic radiation in different bandwidths, or the orthogonally-polarized components of the radiation in a same bandwidth.

According to the present invention, the filter advantageously comprises an additional layer, formed between the support layer and the elements of negative electric permittivity, transparent or partly transparent to the wavelength range, having a thickness smaller than one tenth of the support layer thickness.

Such a thin subsidiary layer may have several functions according to the technological method for forming the main filter elements. It may especially be used as a "bonding layer" between the grating formed of the elements of negative electric permittivity and the waveguide, as a passivation layer for the waveguide (protection of the material), or as a "stop layer" if the grating is formed by an etch method (it avoids etching the guide). Since its index is not necessarily very close to that of the support layer, this subsidiary layer may also be used to adjust the "effective" index close to the grating formed of the elements of negative electric permittivity. An additional degree of liberty is thus obtained for frequency tuning of the filter.

According to an embodiment of the invention, the support layer is suspended in air to have a medium of low index in contact with said layer. It should be noted that in this embodiment, there always is a mechanical support for the slit grating, this support being formed by the support layer. The suspension is thus technologically easy to achieve.

According to an embodiment of the invention, the medium is formed of a so called matching layer having the support layer formed thereon, and satisfying relation $$n1 \geq \frac{5}{3} \times n2.$$

In other words, when the filter is intended to be directly laid on a circuit, like, for example, the detection layer of a photodetector, a matching layer is provided between the circuit and the support layer forming the halfwave plate to implement the strong index contrast.

In particular, the matching layer may be formed of a nanoporous or low-density material. This type of material naturally has very low refractive indexes and is thus appropriate for the matching layer.

For example, nanoporous silica and C60 fullerenes, having an index smaller than 1.5, may be used for the visible range. So-called "low-k" dielectrics, having indexes smaller than 2, may be used for the lowest frequencies (THz, GHz).

More specifically, the matching layer has a thickness ranging between approximately 0.85×N×λ/4×n2 and approximately 1.15×N×λ/4×n2, where λ is the middle of the wavelength range, n2 is the refractive index of the matching layer, and N is an odd integer, preferably equal to 1. Such a thickness enables to optimize the transmission through the matching layer.

The invention also aims at a multiple-frequency optical filter comprising at least two single-frequency filters of the above-mentioned type, the filters having a common support layer, the elements of negative permittivity of one filter forming an assembly separate from the elements of negative permittivity of another filter, and the slits of the different filters all substantially having the same thickness.

The invention also aims at a detector for detecting an electromagnetic radiation in a predetermined wavelength range, comprising a detection circuit sensitive to said range, which, according to the present invention, comprises a single-frequency optical filter or a multiple-frequency optical filter having is support layer suspended in air above the detection circuit.

More specifically, the surface of the support layer facing the detection circuit is coated with a layer which is antireflective and/or of index n2 such that $$n1 \geq \frac{5}{3} \times n2,$$

where n1 is the index of the support layer.

As a variation, the detector comprises a single-frequency optical filter or a multiple-frequency optical filter comprising a matching layer of the previously-mentioned type formed on the detection circuit.

As a variation, the matching layer is formed on a substrate suspended above the detection circuit.

The surface of the support facing the detection circuit is advantageously coated with an antireflection layer.

The invention also aims at the use of a filter of the above-mentioned type, the filter surface comprising the grating being arranged in a medium having a refractive index smaller than or equal to 1.5, the medium especially being air.

In other words, the filter operation is optimized when there also exists a strong index contrast between the support layer and the medium through which the radiation is incident.

BRIEF DESCRIPTION OF THE DRAWINGS

The foregoing and other features and advantages of the present invention will be discussed in detail in the following non-limiting description of specific embodiments in connection with the accompanying drawings, where the same reference numerals designate the same or similar elements, and among which.

DETAILED DESCRIPTION

Figure 1:
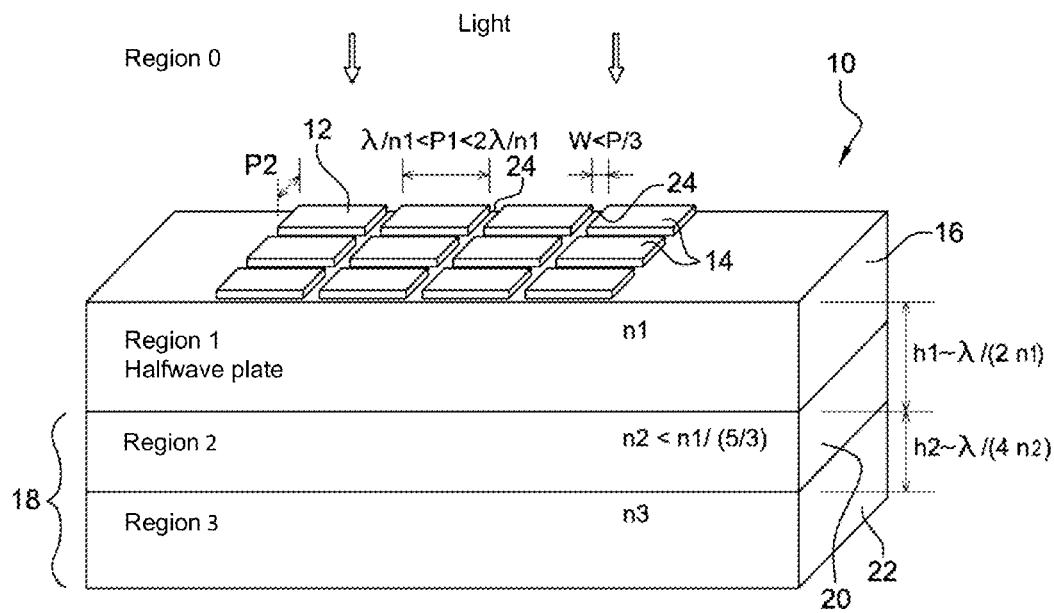
FIG. 1 is a perspective view of an example of structure of a single-frequency optical filter according to the present invention.

FIG. 1 illustrates in perspective view an example of structure of a single-frequency optical filter according to the invention under general reference numeral 10.

Filter 10 comprises reflective negative electric permittivity elements 12 defining two periodic slit gratings 14, 24, intended to receive an incident electromagnetic radiation. Slit gratings 14, 24 are formed on a dielectric support layer 16, said slits 14, 24 emerging on layer 16, and their characteristics are selected so that the gratings have a transmission selectivity in a wavelength range of interest. Layer 16 is transparent to the wavelength range of interest and forms a halfwave plate, and accordingly a waveguide, in this range.

Finally, layer 16, preferably formed of a dielectric of high refractive index, is in contact with a non-metallic medium 18, here shown as a stack of two layers 20 and 22.

Medium 18 has, in contact with support layer 16, a refraction index smaller than that of layer 16. An electromagnetic resonance is thus achieved in layer 16.

For example, layer 22 implements a function which does not relate to the filtering (for example, mechanical support, fastening to a package, antireflection, detection, or others), and layer 20, formed between support layer 16 and layer 22, is not metallic and has a refractive index selected to obtain the resonance. Layer 20 thus has an index "matching" function enabling filter 10 to be completed with a functionalized layer 22, should the application desired for the filter require it.

In the illustrated example, the elements are rectangular pads deposited on layer 16 and defining two orthogonal periodic slit gratings 14, 24, of respective periods P1 and P2.

As a variation, elements 12 may be metal strips deposited on support layer 16 and defining a single periodic slit grating.

For compactness reasons, elements 12, and thus slits 14, 24 have an identical thickness E ranging between approximately 1 time and approximately 3 times the metal skin depth, that is, a thickness ranging between approximately 15 and 55 nm for aluminum, according to whether the wavelength range is infrared or visible.

A tuning of filter 10 to obtain a transmission peak of small width and of high rejection factor in a wavelength range of interest [λ1; λ2] will now be described.

For simplification, it is assumed that elements 12 have a square cross-section, that is, the elements define two orthogonal slit gratings of identical periodicity P1=P2=P, although the following also applies to different periodicities P1 and P2. By selecting elements 12 of square cross-section, filter 10 is advantageously insensitive to the polarization of the incident electromagnetic radiation, while having a transmission maximum always greater than 50%.

First, thickness h1 of support layer 16 is selected to form a halfwave plate in range [λ1; λ2], and refractive index n1 of layer 16 and refractive index n2 of medium 18 in contact with layer 16 are selected to obtain an electromagnetic resonance in layer 16.

More specifically, thickness h1 and indexes n1 and n2 are selected to satisfy the following relations:

$$0.85 \times \frac{\lambda}{2 \times n1} \leq h1 \leq 1.15 \times \frac{\lambda}{2 \times n1} \quad (1)$$

$$\lambda = \frac{\lambda1 + \lambda2}{2} \quad (2)$$

$$n1 \geq \frac{5}{3} \times n2 \quad (3)$$

Preferably, thickness h1 is selected to be slightly smaller than $$\frac{\lambda}{2 \times n1}.$$

As mentioned hereabove, this enables to make the spectral response better than if the strict law $$\frac{\lambda}{2 \times n1}$$

of the guided mode alone is respected.

Then, periodicity P of slit grating 14, defined in the example by the sum of width L of an element 12 and of width W of a slit 14, 24 is selected to satisfy the following relation:

$$\frac{\lambda}{n1} \leq P \leq 2 \times \frac{\lambda}{n1} \quad (4)$$

Finally, width W of slits 14, 24 is selected to satisfy the following relation:

$$W \leq \frac{P}{3} \quad (5)$$

Selecting the parameters of filter 10 according to relations 1 to 5 thus provides a transmission peak of small width, that is, having a width smaller than 10% of the maximum wavelength of the peak, and of high rejection factor, that is, having a rejection factor greater than 90% outside of the peak, and this, at least over a spectral range [λ−λ/4; λ+λ/4].

Further, if a matching layer 20 is provided in the filter, its thickness h2 is selected to satisfy the following relation:

$$0.85 \times N \times \frac{\lambda}{4 \times n2} \leq h2 \leq 1.15 \times N \times \frac{\lambda}{4 \times n2} \quad (6)$$

where N is an odd integer. Preferably, integer N is equal to 1 and thickness h2 is set to $$\frac{\lambda}{4 \times n2}.$$

Selecting a thickness of layer 20 according to relation (6) then optimizes the transmission through layer 20, and thus towards layer 22.

Finally, for an optimal operation of the filter according to the present invention, reflective elements 12 are arranged in a medium having a refractive index smaller than 1.5. Air is particularly advantageous since it has a refractive index close to 1.

Figure 2:
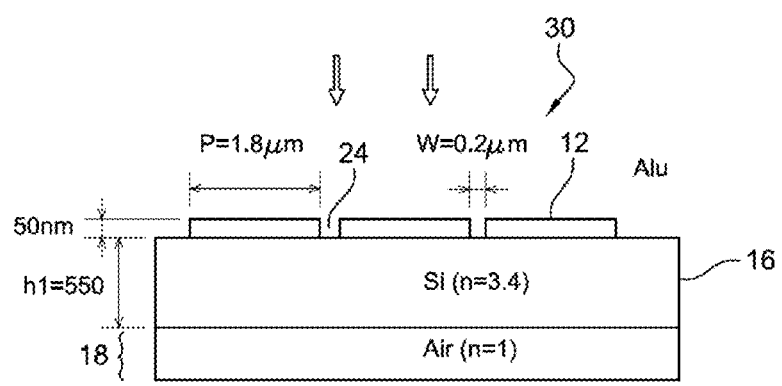
FIG. 2 is a cross-section view of a single-frequency optical filter according to a first embodiment of the invention, tuned to an infrared wavelength and having two orthogonal slit gratings of identical periodicity.

FIG. 2 is a cross-section view of a first embodiment of a single-frequency optical filter 30 operating in the infrared range, that is, in wavelength range [3 μm; 5 μm], with a peak for example tuned to 4.2 μm.

Filter 30 comprises:
slit gratings 24 defined by aluminum elements 12 of square cross-section, having a 50-nm thickness and a 1.8-μm side. Width W of slits 24 is equal to 0.2 μm. Periodicity P of the slit gratings is thus equal to 1.8 μm and the grating is insensitive to the polarization of the incident radiation. The slit gratings are arranged in air.
a silicon support layer 16 (Si), of index n1 equal to 3.42 and of thickness h1 equal to 550 nm Support layer 16 thus forms a halfwave plate tuned to a wavelength equal to 3.8 μm; and
a medium 38 in contact with layer 36 having an index close to 1, that is, air.

Figure 3:
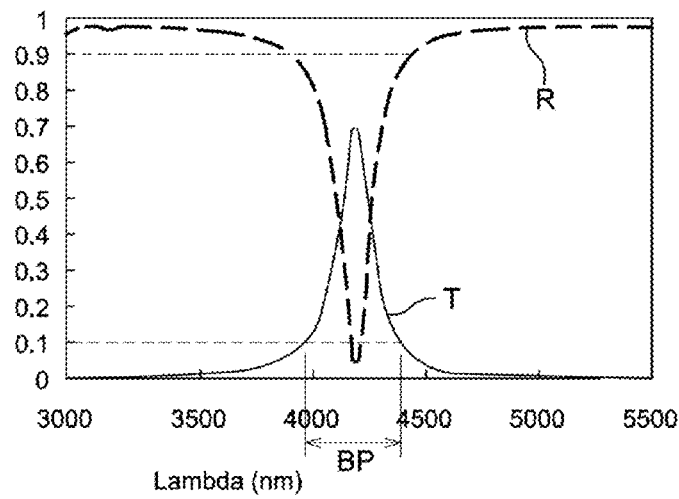
FIG. 3 is a plot of the transmission response and of the reflection response of the filter of FIG. 2.

FIG. 3 illustrates the transmission response ("T" curve) and the reflection response ("R" curve) of filter 30. As can be observed, the transmission peak has a width BP at 0.1 equal to 0.4 micrometers. The mid-height width of the peak is equal to 200 nm, which amounts to 4.5% of the wavelength at the maximum, and the maximum amplitude of the peak is close to 70%. It should also be noted that in the infrared range, the filter according to the invention provides a rejection factor close to 100%.

Conversely, the reflection response comprises a very thin band-stop valley. The width of this valley is here greater than that of the transmission peak, which can be explained by the fact that the filter has been tuned for transmission and not for reflection. Since the reflection profile is not exactly the inverse of the transmission profile, a widest valley is obtained with, however, a deeper amplitude than the peak. It should however be noted that if the filter is intended to be used in reflection mode, the setting of the valley is obtained similarly to the setting of the transmission peak discussed hereinafter.

According to the invention, there thus are four parameters for setting the transmission peak, that is, height h1, period P of the grating, width W of the slits, and thickness E thereof.

As mentioned hereabove, thickness E is selected to be small, and preferably smaller than 50 nm for compactness reasons, although thickness E of the slits may also be used to set the transmission peak.

Figure 4:
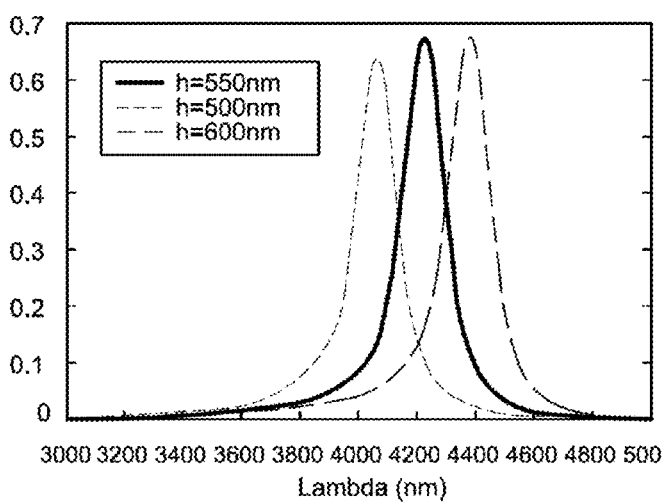
FIGS. 4 to 6 are plots of transmission profiles of the filter of FIG. 2 for different settings of its characteristics.

FIG. 4 illustrates the influence of thickness h1 on the positioning of the transmission peak. This drawing shows the transmission responses of filter 30 of FIG. 2 for different thicknesses h1 (h1=500 nm, h1=550 nm, and h1=600 nm), period P and width W being constant and respectively equal to 1.8 μm and 0.2 μm. As can be observed, the transmission peak is shifted towards higher wavelengths as thickness h1 increases.

Figure 5:
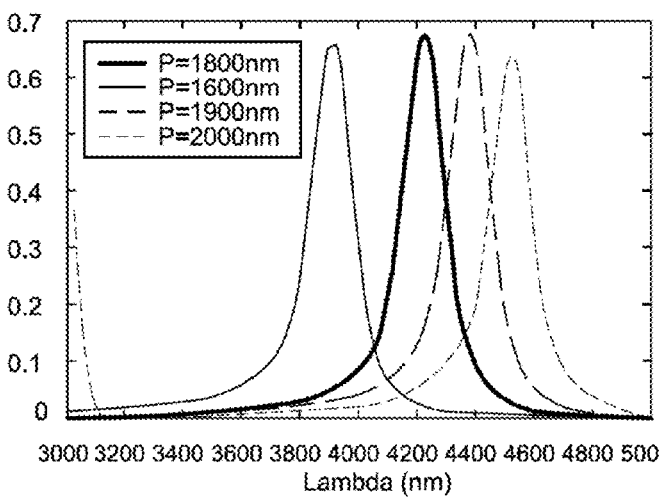

FIG. 5 illustrates the influence of period P on the positioning of the transmission peak. This drawing shows the transmission responses of filter 30 of FIG. 2 for different periods P (P=1.6 μm, P=1.8 μm, P=1.9 μm, and P=2.0 μm), thickness h1 and width W being constant and respectively equal to 550 nm and 0.2 μm. As can be observed, the transmission peak is shifted towards higher wavelengths as period P increases. It can also be observed that the transmission peak deteriorates as period P comes closer to the ends of the interval defined by relation (4) or moves away from said interval.

Figure 6:
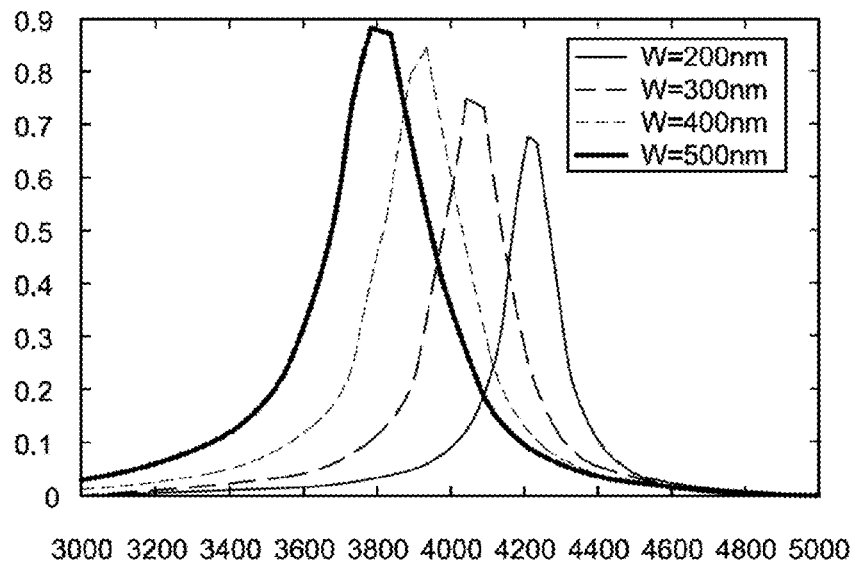

FIG. 6 illustrates the influence of width W on the amplitude and on the width of the transmission peak. This drawing shows the transmission responses of filter 30 of FIG. 2 for different widths (W=0.2 μm, W=0.3 μm, W=0.4 μm, and W=0.5 μm), thickness h1 and period P being constant and respectively equal to 550 nm and 1.8 μm. As can be observed, the amplitude of the transmission peak decreases and its width increases as width W increases. It can also be observed that the transmission peak is shifted towards higher wavelengths as width W increases.

Advantageously, thickness h1 of layer 16 is mainly used to "roughly" position the transmission peak in the spectrum, that is, to select the range of wavelengths of interest [λ1; λ2] containing the transmission peak.

Periodicity P of slit grating 14 is mainly used to "finely" adjust the position of the transmission peak in range [λ1; λ2] selected by means of support layer 16.

Finally, width W of slits 14 is advantageously used to adjust the maximum amplitude of the transmission peak, as well as its width. Width W may also be used to adjust the position of the transmission peak. Further, for large wavelengths (terahertz, infrared), a slit width much smaller than the grating period, that is, on the order of one tenth or less of the grating period, is selected, which improves the reflectivity and the selectivity of the "mirror" formed by the metallic grating at large wavelengths.

Figure 7:
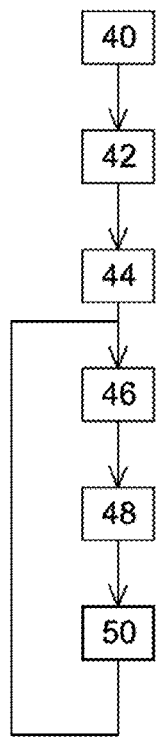
FIG. 7 is a flowchart of the tuning of a filter according to the invention.

FIG. 7 is a flowchart of a method for tuning a single-frequency optical filter according to the present invention, based on the functions assigned to parameters h1, P, and W and discussed hereabove.

In a first step 40, the user defines the location desired for the transmission peak, for example, a peak located at 4.2 μm, and defines a wavelength range comprising this peak, to for example, the infrared range [3 μm; 5 μm]. The user also selects materials for support layer 16 and medium 18 capable of obtaining a strong index contrast, and especially indexes satisfying relation (3). For example, layer 16 is made of silicon of index 3.42 and medium 18 is air of index equal to 1. Similarly, a material is selected for slit grating 14, 24, for example, aluminum.

In a next step 42:
the thickness of support layer 16 is on the middle of the range, that is, in the example, a thickness set to 4 μm, thus corresponding to a wavelength equal 585 nm; and
periodicity P of the grating is set to the middle of the range defined by relation (4), that is, in the present example, set to 1.8 μm, thickness E of slits 14, 24 is set to a low value, for example, 50 nm, and width W of the slits is selected to be equal to P/3, that is, in this example, equal to 0.6 μm.

The method then continues as 44 with a step of setting of height W to obtain a transmission peak of maximum amplitude and of desired thickness, that is, in this example, a width W equal to 0.2 μm.

Then at 46, period P is modified in the interval of relation (4) defined by the current value of thickness h1, to see if it is possible to tune the transmission peak to the desired value, here 4.2 μm, with no significant degradation thereof. If it is, the filter parameters are thus set.

If it is not possible to tune the transmission peak with no degradation (case of the present example), the method continues at 48 with the setting of the period to the middle of the interval of relation (4) defined by the current value of thickness h1, after which thickness h1 is modified, at 50, to bring the transmission peak closer, as much as possible, to the target wavelength with no significant degradation.

If modifying h1 enables to achieve this wavelength, the filter parameters are thus set (case of the present example), otherwise step 50 loops back to step 46 with the new value of h1 for a modification of period P in a new interval according to relation (4).

This process is then repeated until the final tuning of the filter.

It is of course possible, by means of a mathematical model, to determine the transmission of filter 30 according to parameters h1, P, and W and to fully describe the parameter space around the target wavelength, and thus to simplify the filter tuning process according to the invention.

In particular, the electromagnetic modeling of the filter is performed by RCWA ("Rigorous Coupled Wave Analysis"), such as described by P. Lalanne and G. M. Morris, J. Opt. Soc. Am. A, 13, 779 (1996) or G. Granet and B. Guizal, J. Opt. Soc. Am. A, 13, 1019 (1996).

In the embodiment of FIG. 2, support layer 16 is in contact with air, which is advantageous since air has a low refractive index close to 1. The use of such a filter thus assumes that it is suspended above air.

Figure 8:
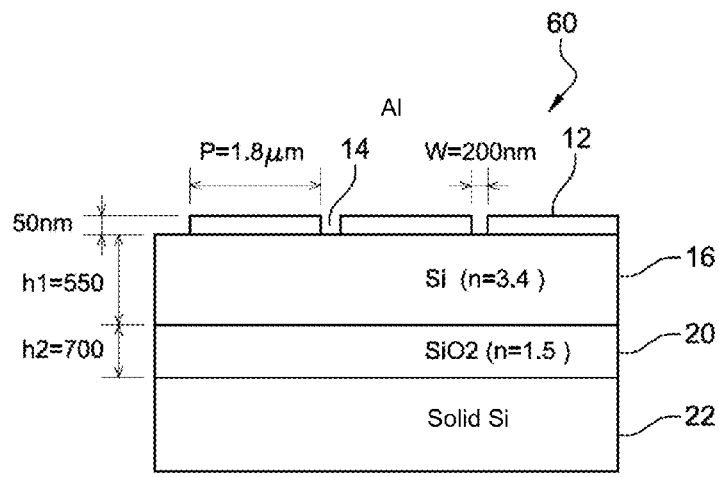
FIG. 8 is a cross-section view of a single-frequency optical filter according to a second embodiment of the invention, tuned to an infrared wavelength and having two orthogonal slit gratings of identical periodicity.

FIG. 8 illustrates a second embodiment of a filter 60 according to the invention. Filter 60 differs from that of FIG. 2 in that support layer 16 is deposited on a matching layer 20, for example, made of $SiO_2$ of refractive index n2 equal to 1.5. Thickness h2 of matching layer 20 is set to value 700 nm which optimizes the transmission towards layer 22.

Figure 9:
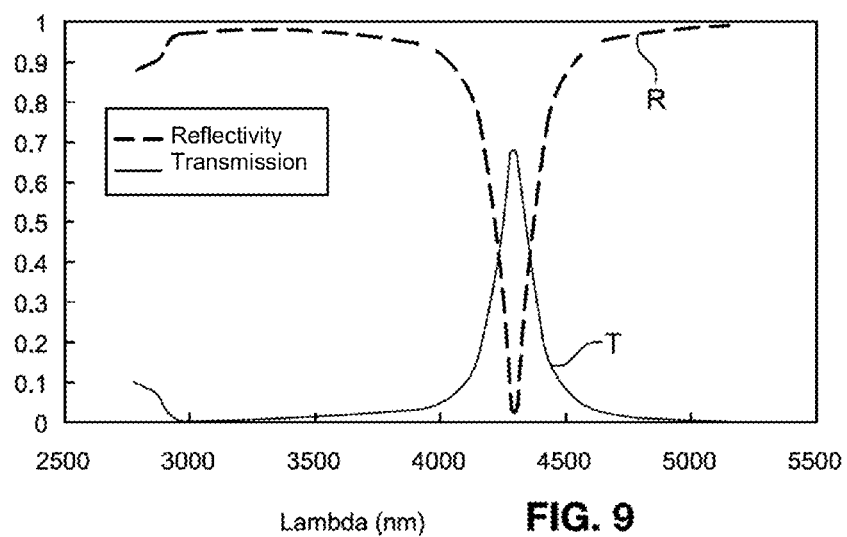
FIG. 9 is a plot of the transmission profile and of the reflection profile of the filter of FIG. 8
Figure 10:
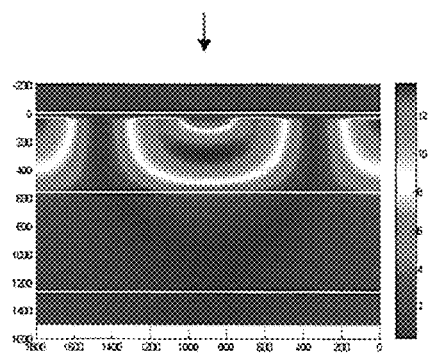
FIG. 10 is a map of the density of the magnetic field at the maximum transmission in the filter of FIG. 8.

FIG. 9 illustrates the transmission response ("T" curve) and the reflection response ("R" curve) of filter 60. As can be observed, the responses have a profile similar to that of FIG. 3. FIG. 10 illustrates the magnetic field in filter 60 at the wavelength of the transmission peak maximum. It should thus be noted that the magnetic field is mainly concentrated in layer 16 forming a halfwave plate and under elements 12. This mapping thus illustrates a resonant excitation of hybrid surface plasmon/waveguide modes in layer 16. A similar magnetic field mapping is also obtained for filter 30 of FIG. 2.

The filters of FIGS. 2 and 8 have elements 12 of square cross-section defining two orthogonal slit gratings of identical periodicity P, thus enabling such filters to be insensitive to the polarization of the incident electromagnetic radiation.

In a third embodiment of the invention, elements 12 have a rectangular and no longer square cross-section, and thus define two orthogonal gratings of periods P1 and P2.

As an illustration, such a filter differs from that of FIG. 2 in that elements 12 have a first side length of 1.3 μm and a second side length of 1.6 μm. Slits W all have a 0.2-μm width so that the first grating has a periodicity P1 equal to 1.5 μm and the second grating has a periodicity P2 equal to 1.8 μm.

Figure 11:
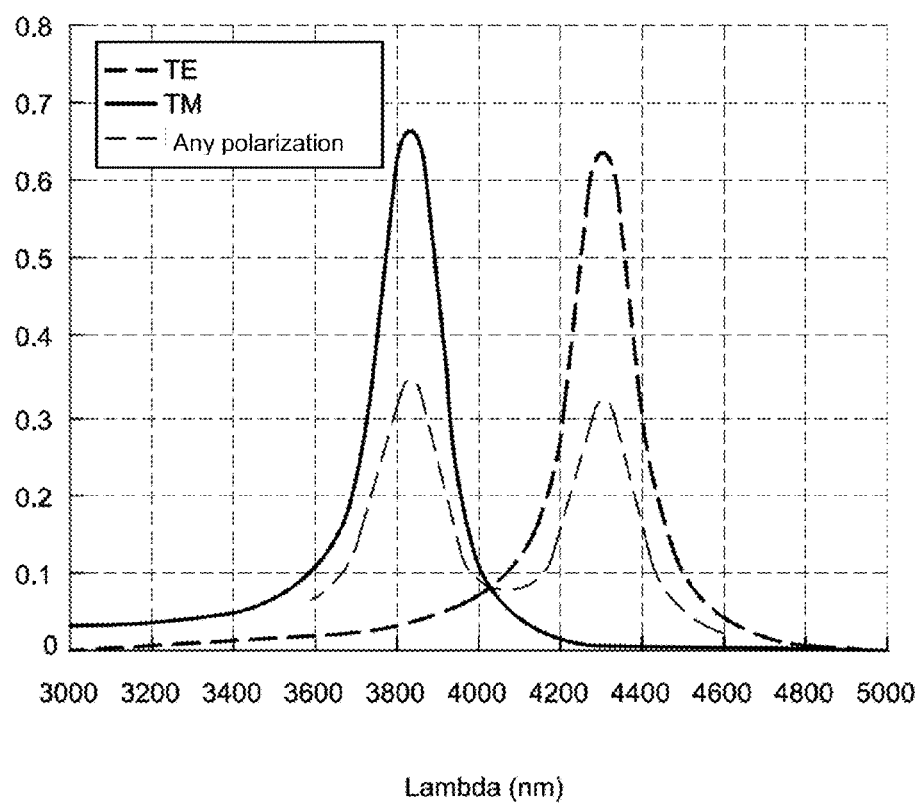
FIG. 11 is a plot of transmission profiles of a single-frequency optical filter according to a third embodiment having two orthogonal slit gratings of different periodicities.

FIG. 11 illustrates the transmission responses of this filter for a radiation polarized parallel to the first grating ("TM" curve), for a radiation polarized parallel to the second grating ("TE" curve) and for a radiation having any polarization ("Q" curve).

As shown, a dual-spectrum filter is obtained, which is sensitive to the polarization of the incident radiation and has a rejection factor outside of transmission peaks equal to 90%.

In the previous embodiments, the patterns defining the gratings are identical and periodic, thus providing a single-frequency optical filter insensitive to the polarization of the incident radiation (case of elements of square cross-section) or a dual-frequency optical filter sensitive to the polarization of the incident radiation (case of elements of non-square rectangular cross-section).

The present invention also enables to obtain multiple-frequency optical filters in a radiation range where each transmission peak is insensitive to the polarization of the incident radiation.

Figure 12:
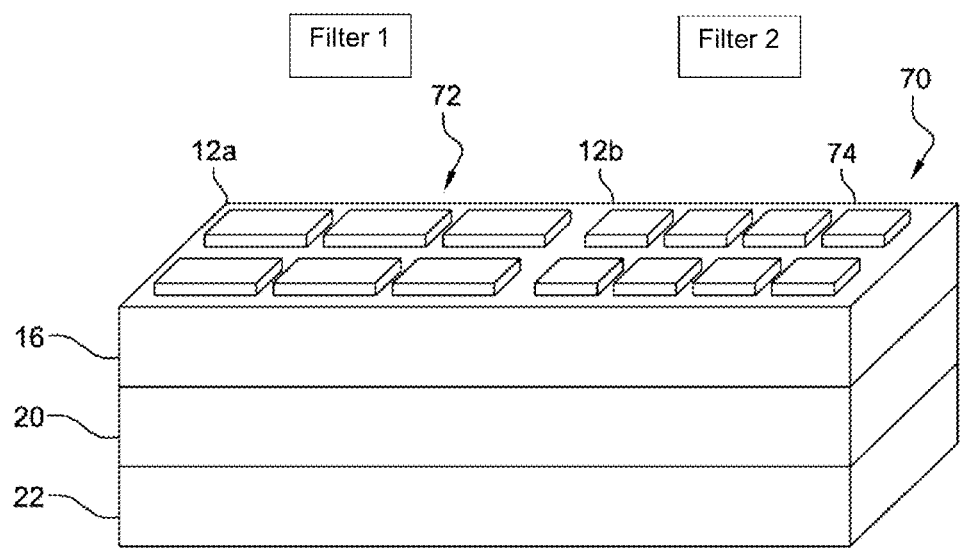
FIG. 12 is a perspective view of an example of structure of a dual-frequency optical filter according to the present invention.

An example of such a filter is illustrated in cross-section view in FIG. 12. Filter 70 only differs from the previously-described single-frequency filters in that it comprises at least two juxtaposed assemblies 72 and 74 of reflective elements 12a and 12b similar to elements 12. These assemblies are deposited on one and the same support layer 16, possibly completed with a matching layer 20, and possibly with a functionalized layer 22.

For example, two assemblies 72 and 74 are provided and elements 12a and 12b have a square cross-section and different dimensions. Two transmission peaks insensitive to the radiation polarization are thus obtained. Of course, the shape and the size of each of assemblies 72 and 74 are selected according to the considered wavelength ranges.

It should only be noted that a single support layer is used and that the total thickness of the multiple-frequency filter may be selected to be identical at all points of the filter.

As discussed hereabove, thickness h1 of layer 16 mainly enables to select a wavelength range in the spectrum, and periods P of the gratings of each of assemblies 72, 74, as well as width W of the slits, enable to adjust the position of the transmission peaks in this range. It can even be shown that the invention enables to obtain a dual-frequency filter having a transmission peak in infrared and a transmission peak in the visible range.

This type of multiple-frequency filter is especially useful in color imaging in the visible range. In this field, an array of photodetectors is usually covered with a Bayer array based on color resins.

One also comes across similar considerations, for example, in the field of so-called "color" infrared imaging, where a Bayer array is stacked to the array of photodetectors to make the latter selective to a specific wavelength of the infrared range.

The Bayer array may advantageously be replaced with a multiple-frequency optical filter according to the present invention. In the case of color imaging in the visible range, the filter comprises a $Si_3N_4$ support layer (having a refractive index equal to 2) having a thickness h1 equal to 120 nm, suspended in the air above an array detection circuit, and three types of assemblies of reflective elements, each forming two orthogonal slit gratings of identical period, are deposited on support layer 16 according to a Bayer pattern. The three types of assemblies are formed of aluminum elements having a 30-nm thickness and a square cross-section.

The first type of assembly, intended for the transmission of blue wavelengths, defines two orthogonal slit gratings having a width equal to 200 nm and a period equal to 270 nm.

The second type of assembly, intended of the transmission of green wavelengths, defines two orthogonal slit gratings having a width equal to 275 nm and a period equal to 360 nm.

The third type of assembly, intended of the transmission of red wavelengths, defines two orthogonal slit gratings having a width equal to 340 nm and a period equal to 440 nm.

Figure 13:
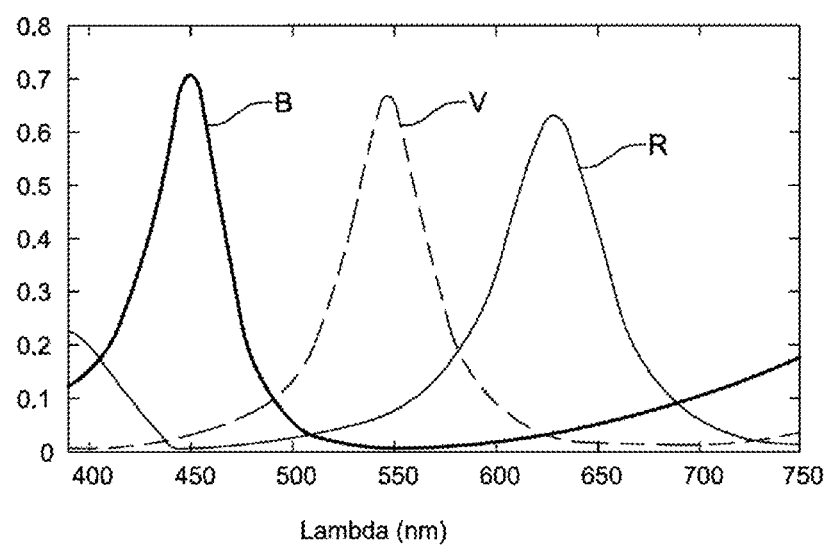
FIG. 13 is a plot of transmission profiles of a multiple-frequency optical filter according to the invention applying a filtering for the red, green, and blue components of a visible radiation.

FIG. 13 illustrates the transmission responses of such a filter for blue wavelengths ("B" curve), for green wavelength ("G" curve), and for red wavelengths ("R" curve).

In the previous examples, the reflective elements are made of metal, and especially of aluminum. Other metals may be used, such as gold, silver, copper, or platinum, or an alloy thereof.

Further, the metals may be replaced with any material having reflection properties similar to those of metals in the wavelength range targeted by the filtering.

In particular, a material having a relative permittivity with a large imaginary part, that is, on the order of 10 or more, that is, a highly-conductive or highly-absorbing material, may to be used. For example, silicon may be used in the ultraviolet range (from 10 nm to 380 nm) and heavily-doped N-type silicon may be used in infrared.

An ion crystal having a negative permittivity, such as SiC in far infrared (towards 10-12 μm), for example, may also be used.

Similarly, in the previously-illustrated examples, the reflective elements forming the slit gratings are directly deposited on support layer 16. Advantageously, a thin layer, having a thickness on the order of one tenth of the thickness of support layer 16, and a refractive index smaller than that of support layer 16, is provided, to modify the refractive index in contact with layer 16. This thin additional layer for example is a layer having an index gradient and may further fulfill another function, such a bonding, passivation, or protection function.

In the infrared range, this layer may for example be a $Si_3N_4$ passivation/protection layer (index=2) for a Si support layer (index=3.4). As a variation, this additional layer may be a CdTe gradient index layer (index ~2.7) for an HgCdTe support layer (with 44% of Cd, index ~3). Still as a variation, this additional layer may also be a very thin titanium bonding layer.

In the visible range (from 380 nm to 780 nm), thickness h1 of support layer 16 may be a problem if this layer has too high a refractive index. To make the filter manufacturing easier in this range, the support layer is formed of a material selected from the group comprising $Si_3N_4$, SiN, ZnS, GaP, $Al_2O_3$, $Cr_2O_3$, ZnO, SiC, $TiO_2$, $MgF_2$, $SrF_2$, LiF, NaF, or $CaF_2$, and transparent organic materials having a refractive index greater than 5/3, or of an alloy of these materials.

To obtain the highest possible index contrast, the support layer is suspended in air or a matching layer made of a nanoporous or low-density material is used. Of course, such materials may also be used for higher wavelength ranges.

In the infrared range, thickness h1 of support layer 16 is less critical and materials having a high refractive index are advantageously used. Especially, support layer 16 is formed of a material such as Si, Ge, SiGe, CdTe, ZnS, InP, InSb, AlSb, GaSb, GaAs, HgCdTe, or ZnFe$_2$O$_4$, or of an alloy based on these materials. Layer 16 may also be formed of a birefringent material, for example perovskite CaTiO$_3$, HgS, hematite Fe$_2$O$_3$, or rutile to TiO$_2$. Medium 18 in contact with support layer 16 can thus be selected from a wider range. Of course, the support layer may be suspended in air or be in contact with a non-metallic matching layer made of a nanoporous or low-density material, a satisfactory contrast being however obtained with any material satisfying relation (3), many dielectric satisfying this relation.

It should also be noted that since the thickness of reflective elements 12 forming the slit gratings is selected to be very small, and preferably smaller than 50 nanometers for aluminum, the lateral dimensions of these elements are thus greater than their thickness.

Such elements may thus simply be formed by means of techniques current in the art, such as for example an optical or electronic photolithography. For example, once support layer 16, and matching layer 20 and functionalized layer 22, if present, have been formed, elements 12 may be formed by a "lift-off"-type method, the resin patterns used by this technique being formed by simply lithography or by "nanoimprint", or by etching of a thin metal layer. In this last case, a slight hollowing of support layer 16, on the order of some ten nanometers, can be observed between elements 12, without for this to substantially impact the filter operation.

Figure 14:
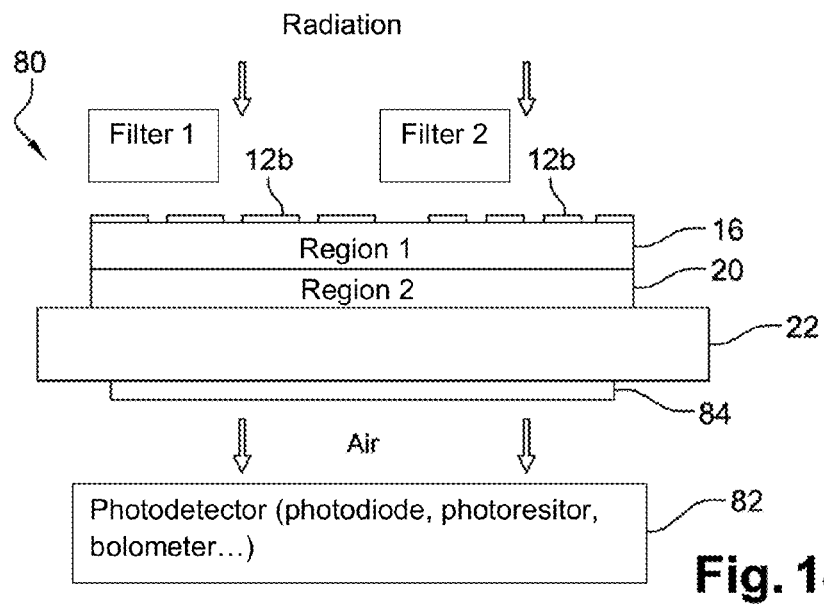
FIG. 14 is a cross-section view of a first type of photodetector comprising a filter according to the invention.

FIG. 14 illustrates a first embodiment of a detector 80 equipped with a single- or multiple-frequency filter according to the invention. In this example, the detector comprises a detection circuit 82 sensitive to a predetermined wavelength range, such as for example a circuit comprising an array of CMOS detection elements (photodiodes, phototransitors, etc. . . . ) or an array of microbolometers or of photoresistors, etc. . . .

A single- or multiple frequency optical filter according to the invention is arranged above circuit 82 by means of a substrate 22, for example, made of silicon. The substrate is for example fastened to a detector protection package and thus physically isolates the filter from detection circuit 82. A matching layer 20 is then provided. Similarly, an antireflection layer 84, and especially a quarter-wave plate, advantageously covers the free surface of substrate 22, so that the radiation reflected by circuit 82 does not disturb the filter operation or that the radiation crossing substrate 22 is not partially sent back to the filter.

Figure 15:
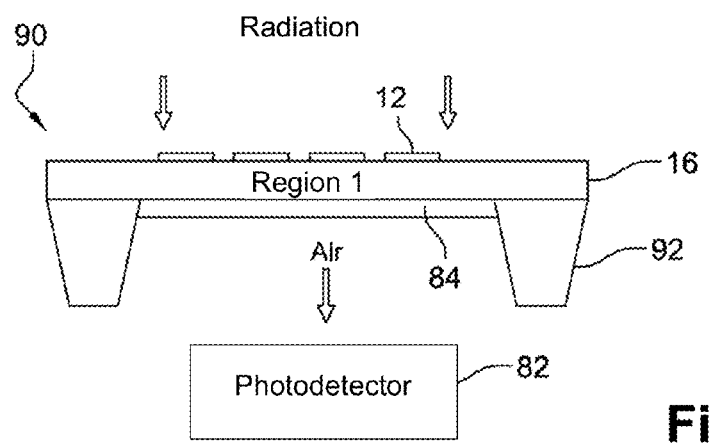
FIG. 15 is a cross-section view of a second type of photodetector comprising a filter according to the invention.

In a second embodiment of a detector 90 illustrated in FIG. 15, the filter according to the invention is suspended in air above detection circuit 82 by means of a bridge 92 and may also comprise an antireflection layer 84 and/or satisfying relation (3). It should be noted that if the layer is an anti-reflection layer, its index must at least satisfy relation (3). However, if its index satisfies this relation, it is not necessarily an anti-reflection layer and then fully belongs to bridge 92 as a plate.

Figure 16:
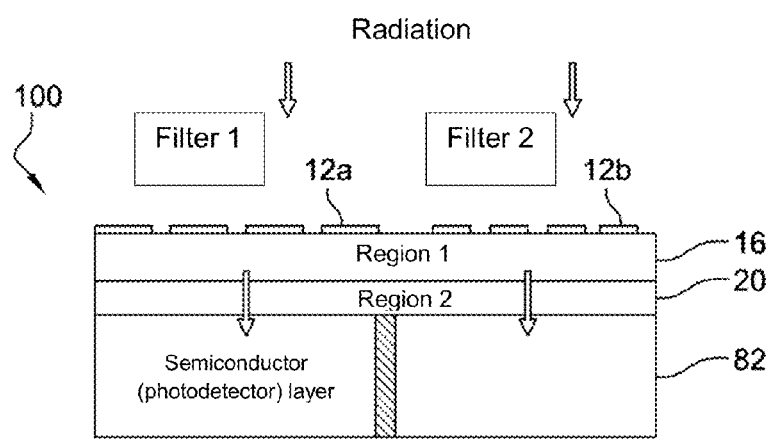
FIG. 16 is a cross-section view of a third type of photodetector comprising a filter according to the invention.

In a third embodiment of a detector 100 illustrated in FIG. 16, the filter according to the invention is directly formed on detection circuit 82, a matching layer 20 being then provided.

The invention claimed is:

1. A single-frequency optical filter comprising elements with a negative electric permittivity, and especially reflectors, formed on a surface of a dielectric support layer and defining at least one periodic grating of parallel through slits, the periodicity, the height, and the width of the slits being selected to that said slit grating forms a wavelength-selective structure for a wavelength ranging within a predetermined wavelength range:

wherein the thickness and the refractive index of the support layer are selected so that said layer forms a halfwave plate for a wavelength from said predetermined range of wavelengths;

wherein the filter further comprises, in contact with the surface of the support layer opposite to that having the slit grating formed thereon, a medium having a refractive index smaller than that of the support layer to obtain a resonant guided mode in the support layer;

wherein the period of the or of each of the slit gratings ranges between approximately $$\frac{\lambda}{n1}$$

and approximately $$2 \times \frac{\lambda}{n1},$$

where $\lambda$ is a wavelength from the predetermined range of wavelengths and n1 is the refractive index of the support layer;

and wherein the refractive indexes of the support layer and of the medium satisfy the relation $$n1 \geq \frac{5}{3} \times n2,$$

where n1 is the index of the support layer, and n2 is the index of the medium.

2. The single-frequency optical filter of claim 1, wherein the thickness of the support layer ranges between approximately $$0.85 \times \frac{\lambda}{2 \times n1}$$

and approximately $$1.15 \times \frac{\lambda}{2 \times n1}.$$

3. The single-frequency optical filter of claim 2, wherein the matching layer has a thickness ranging between approximately $$0.85 \times N \times \frac{\lambda}{4 \times n2}$$

and approximately $$1.15 \times N \times \frac{\lambda}{4 \times n2},$$

where $\lambda$ is the middle of the wavelength range, n2 is the refractive index of the matching layer, and N is an odd number.

4. The single-frequency optical filter of claim 1, wherein the width of the slits of the or of each periodic slit grating is smaller than one third of the grating period.

5. The single-frequency optical filter of claim 1, wherein the support layer is formed of a material selected from the group comprising $Si_3N_4$, SiN, ZnS, GaP, $Al_2O_3$, $Cr_2O_3$, ZnO, SiC, $TiO_2$, $MgF_2$, $SrF_2$, LiF, NaF, and $CaF_2$, and transparent organic materials having a refractive index greater than 5/3, or of an alloy of these materials.

6. The single-frequency optical filter of claim 1, wherein the support layer is formed of a material selected from the group comprising Si, Ge, SiGe, CdTe, ZnS, InP, InSb, AlSb, GaSb, GaAs, and HgCdTe, $ZnFe_2O_4$, birefringent materials, or an alloy of these materials.

7. The single-frequency optical filter of claim 1, wherein the elements of negative electric permittivity forming said at least one slit grating are formed of a metal and have a thickness ranging between approximately 1 time and approximately 3 times the skin depth of the metal.

8. The single-frequency optical filter of claim 7, wherein the elements of negative electric permittivity forming said at least one slit grating are made of aluminum and have an identical thickness smaller than or equal to 50 nanometers.

9. The single-frequency optical filter of claim 1, wherein the elements of negative electric permittivity forming the at least one slit grating are formed of a material having a permittivity with an imaginary part selected so that said material is reflective in the wavelength range, and especially Si in the ultraviolet range or heavily-doped Si in infrared.

10. The single-frequency optical filter of claim 1, wherein the elements of negative electric permittivity forming the at least one slit grating are formed of an ion crystal having a negative permittivity, and especially SiC.

11. The single-frequency optical filter of claim 1, wherein the elements of negative electric permittivity are rectangular blocks defining two orthogonal periodic slit gratings.

12. The single-frequency optical filter of claim 11, wherein the blocks are square and define two slit gratings of same periodicity.

13. The single-frequency optical filter of claim 1, wherein it comprises an additional layer, formed between the support layer and the elements of negative electric permittivity, transparent or partly transparent to the wavelength range, having a thickness smaller than one tenth of the thickness of the support layer.

14. The single-frequency optical filter of claim 1, wherein the support layer is suspended in air.

15. The single-frequency optical filter of claim 1, wherein the medium is formed of a so-called matching layer having the support layer formed thereon, and satisfying relation $$n1 \geq \frac{5}{3} \times n2.$$

16. The single-frequency optical filter of claim 15, wherein the matching layer is formed of a nanoporous or low-density material.

17. A multiple-frequency optical filter comprising at least two single-frequency filters of claim 1, the filters having a common support layer, the elements of negative permittivity of one filter forming an assembly separate from the reflective elements of another filter, and the slits of the different filters all substantially having the same thickness.

18. A detector for detecting an electromagnetic radiation in a predetermined wavelength range, comprising a detection circuit sensitive to said wavelength range, wherein it comprises the single-frequency optical filter or the multiple-frequency optical filter of claim 17, the support layer being suspended in air above the detection circuit.

19. The detector of claim 18, wherein the surface of the support layer facing the detection circuit is coated with a layer which is antireflective and/or of index n2 such that $$n1 \geq \frac{5}{3} \times n2,$$

where n1 is the index of the support layer.

20. A detector for detecting an electromagnetic radiation in a predetermined wavelength range, comprising a detection circuit sensitive to said wavelength range, wherein it comprises the single-frequency optical filter or the multiple-frequency optical filter of claim 17, the matching layer being formed on the detection circuit.

21. A detector for detecting an electromagnetic radiation in a predetermined wavelength range, comprising a detection circuit sensitive to said wavelength range, wherein it comprises the single-frequency optical filter or the multiple-frequency optical filter of claim 17, the matching layer being formed on a substrate suspended above the detection circuit.

22. The detector of claim 21, wherein the surface of the support facing the detection circuit is coated with an antireflection layer.

23. A use of the filter of claim 1, the filter surface comprising the grating being arranged in a medium having a refractive index smaller than or equal to 1.5, the medium especially being air.

* * * * *